United States Patent [19]

Okazaki et al.

[11] 3,998,645
[45] Dec. 21, 1976

[54] THERMOPLASTIC TRAFFIC PAINT
[75] Inventors: Hiroyuki Okazaki, Toyonaka; Yasuyuki Suzuki, Ibaragi, both of Japan
[73] Assignee: Sumitomo Chemical Company, Limited, Osaka, Japan
[22] Filed: July 2, 1975
[21] Appl. No.: 592,624

Related U.S. Application Data

[63] Continuation of Ser. No. 450,684, March 13, 1974, abandoned.

[30] Foreign Application Priority Data

Mar. 16, 1973  Japan .............................. 48-31125

[52] U.S. Cl. ................................. 106/30; 106/241; 260/37 R; 260/38; 260/39 P; 260/42.21; 404/14
[51] Int. Cl.$^2$ ...................... C08F 45/66; E01F 9/08

[58] Field of Search ................ 404/14; 106/19, 30, 106/241; 260/37, 176, 41, 42.21

[56] References Cited

UNITED STATES PATENTS

| | | | |
|---|---|---|---|
| 2,739,146 | 3/1956 | Weigele et al. | 260/176 |
| 3,046,851 | 7/1962 | de Vries | 404/14 |
| 3,891,451 | 6/1975 | Okazaki | 106/241 |

OTHER PUBLICATIONS

Chem. Abst. 71:4250

*Primary Examiner*—Theodore Morris
*Attorney, Agent, or Firm*—Stevens, Davis, Miller & Mosher

[57] ABSTRACT

A thermoplastic traffic paint containing as a pigment, 4,4'-bis[acetoacet-(2'',5''-dimethoxy-4''-chloro)anilido-2-azo]-3,3'-dichlorodiphenyl.

4 Claims, No Drawings

THERMOPLASTIC TRAFFIC PAINT

This is a continuation of application Ser. No. 450,684 filed Mar. 13, 1974, now abandoned.

The present invention relates to a thermoplastic traffic paint, and more particularly to a thermoplastic traffic paint containing at least one pigment, at least one filler and at least one natural or synthetic resin characterized in that 4,4'-bis[acetoacet-(2'',5''-dimethoxy-4''-chloro)anilido-2-azo]-3,3'-dichlorodiphenyl is used as the said pigment.

A traffic paint, which is either white or yellow, is applied to road-marking such as road surface, center line, lane line, stop line, pedestrain crossing, runway of air-field and the like, and is essential for the effective and safe use of limited road surface. The traffic paint has three types according to the application methods, an air-dry type, hot-spray type and thermoplastic type. An object of the present invention is to provide a useful yellow traffic paint for the thermoplastic types.

The conventional coloring component which has generally been incorporated in the yellow thermoplastic traffic paints, is cadmium yellow pigment alone or a mixture thereof with coated chrome yellow (having better heat resistance) pigment. In recent years, however, the environmental pollution problems resulting from heavy metals have made very difficult the use of cadmium yellow and chrome yellow pigments which contain as a major component heavy metals such as cadmium, lead and chromium. Therefore, development of pollution-free colorant has commercially been required fairly strongly as a substitute for these pigments. Moreover, a traffic paint of high re-reflectivity at night has lately been required fairly strongly for the purpose of strengthening traffic safety.

Very severe requirements are imposed on the performance of thermoplastic traffic paint, and consequently on the property of colorants to be incorporated therein. For example, a fairly high resistance to heat is required to pigments, because the paints (containing pigments, resins and fillers) are applied to road after they were melted by heating. Moreover, a weathering resistance which is durable for more than one year is also very essential for pigments, because the paint is almost used outdoors.

In general, inorganic pigments are superior to organic pigments in fastnesses to heat and weather, and particularly cadmium pigments among the inorganic pigments have so much high fastnesses to heat and weather that it is not too much to say that there will be no substitute for the cadmium pigment. However, from the fact that serious social problems due to cadmium pollution have appeared in various publications including newspapers, the use of the said pigment will probably be limited more and more severely in future.

On the other hand, this situation is also completely the same with chrome yellow pigment, and more disadvantageously, the pigment and even its heat resistance-improved grade (coated chrome yellow) are very unsatisfactory in terms of resistances to heat and weather compared with cadmium pigment. Therefore, pollution-free colorants which are available for thermoplastic traffic paints have been strongly required to be developed.

Although considerably kinds of yellow colorant (pigment) are now on the market, it is very difficult to find out inorganic pigments which can be used in place of cadmium yellow and chrome yellow pigments. Therefore the substitutes must be searched for among organic pigments.

The present inventors have extensively studied the organic yellow pigments which are now on the market, and were newly prepared by the present inventors, and found that the above-named yellow colorant is satisfactory for the thermoplastic traffic paint from economical and practical viewpoint.

The above-named pigment used in the present invention is well known as so-called C.I. Pigment Yellow 83 represented by the following formula,

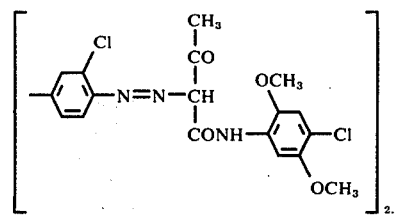

It is a very surprising fact that the pigment alone specified in the present invention should be comparable to the conventional inorganic pigments.

The thermoplastic traffic paint of the present invention comprises at least one filler and at least one natural and/or synthetic resin in addition to the present pigment, and may contain, if necessary, a small amount of other organic, inorganic or extender pigments, and the other materials.

The fillers include crushed marble, white sands and glass beads. The synthetic resins include petroleum resins, melamine resins, synthetic rubbers, phthalic resins, acrylic resins, and phenolic resins. And as the natural resins, there are exemplified naturally occurring resins such as rosin.

The pigment of the present invention may be used as it is, and preferably in the form of the so-called conditioned pigment which can be formulated by incorporating other pigments, additives and treating agents.

That is, the pigment may be used in the form of:

1. pigment composition formulated, for example, by mixing or simultaneously pulverizing the present pigment together with other one or more pigments,
2. dry colors (conditioned pigment) formulated by using higher fatty acids or metallic salts thereof,
3. color pastes formulated by using plasticizers such as DOP (dioctyl phthalate) and DBP (dibutyl phthalate), and
4. color chips and color master batches formulated by dispersing pigments into resins compatible with the system to be applied.

Other organic and inorganic pigments and extender pigments which may be used, if necessary, in the present invention include various pigments shown in Pigment Handbook, second edition, p.p. 2 and p.p. 7 – 49 (complied by Japan Pigment Technical Association and published by Seibundo Shinkosha). Among the pigments, those which can meet the severe requirements such as non-pollution, excellent resistances to heat and weather, and at the same time low cost, include titanium dioxide as white pigments, precipitated barium sulfate and precipitated calcium carbonate as extender pigments, and carbon black and red iron oxide as colored inorganic pigments. Colored organic pigments other than yellow pigments include phthalocyanine, quinacridone, perinone and dioxazine type ones all of which are used for color-matching. As mentioned above, it is very difficult to find other yellow pigments which can meet the objects of the present invention appropriately, except the present pigment, that is, C.I. Pigment Yellow 83.

The other materials which may be contained, include surfactants and plasticizers as the control agent of paint viscosity, and materials for improving the property of the paint film.

The formulation of the thermoplastic traffic paints of the present invention will be illustrated in more details as follows.

The aforesaid resin, filler and pigment and, if necessary, other materials are added to a melting apparatus and thoroughly mixed under heating to prepare a uniform molten mixture. The mixing can be carried out for a short time in the apparatus equipped with a stirrer and a heating device such as a gas burner, however for avoiding the degradation of resins and pigments due to local heating, it is desirable to use a melter with both heat-controller and a highly efficient stirrer. The heating time and temperature depend upon the types of melting apparatus and resins used, however in general the formulation is carried out at 150° to 220° C within 1 hour, and preferably at below 200° C within 30 minutes.

For obtaining the same shade as that of the yellow line being applied on road, or cadmium yellow or chrome yellow, and for obtaining the same excellent physical property such as hiding power or consistency as that of the paint with cadmium yellow or chrome yellow incorporated therein, it is preferred to use a white pigment such as titanium dioxide in combination with the present pigment. The mixing ratio of the present pigment to white pigment may be 5 – 95 : 95 – 5, and in the case of titanium dioxide the ratio is preferably 90 – 30 : 10 – 70. In some cases where the melt viscosity of formulated paint is increased because of the kinds of resin incorporated in paint and the mixing ratios of the resins, pigments and fillers, so that the paint is very difficult to apply, it is desirable to control the viscosity properly by adding plasticizers such as DOP (dioctyl phthalate) and DBP (dibutyl phthalate), natural oils such as tung oil, or surfactants to the paint in the proportion of below several percent based on the whole system. In the traffic paints the weight ratio of each material is not especially fixed and is determined by the property to be desired, namely the flow of paints, the fasteness of paint film, the adhesiveness to the road and so, but usually the ratio of resins is about 20 – 30% by weight based on the whole system, filler including the extender pigments and glass beads about 40 – 70% by weight, yellow colorant about 0 – 10% by weight and the other materials several % by weight.

The traffic paint thus prepared can be applied to road durable yellow according to the thermoplastic type application.

The present invention will be illustrated with reference to the following examples, which are only given for the purpose of illustration and not to be interpreted as limiting. Parts are by weight.

EXAMPLE 70 parts of the pigment, 4,4'-bis[acetoacet-(2'',5''-dimethoxy-1''-chloro)anilido-2-azo]-3,3'-dichlorodiphenyl, 15 parts of a rutile type titanium dioxide and 15 parts of stearic acid were mixed and pulverized together by means of an atomizer to prepare a pigment composition (conditioned pigment).

One part of the pigment composition, 25 parts of rosin-modified maleic resin, 4 parts of acryl-modified alkyd resin, 56 parts of crushed marble of about 0.6 mm in diameter and 14 parts of glass beads of 0.8 mm in diameter were mixed and then the mixture was formulated into a traffic paint by thoroughly mixing in a fluid state at 190° to 200° C.

The traffic paint thus prepared had the following performances.

1. Test results of heat resistance showed that the color change of the paint was hardly observed at 230° C for 3 hours and also even at 190° to 200° C for 6 hours.
2. Test results of weathering resistance showed that the paint film was so durable as to withstand an outdoor exposure of more than six months without problems.
3. The pigment composition (conditioned pigment) was dispersed uniformly and very rapidly within one minute.
4. The stability to chemicals was very high.
5. The tinting strength was superior to a 1 : 1 mixture of cadmopone yellow and coated chrome yellow (heat resistance-improved chrome yellow).

COMPARATIVE EXAMPLE

Table 1 shows the comparative result of quality between the pigment composition (conditioned pigment) obtained in Example and the colorant (a 1 : 1 mixture of cadmopone yellow and chrome yellow) which is in a practical use for a yellow thermoplastic traffic paint.

Table 1

|  |  | Cadmopone yellow: chrome yellow = 1 : 1 (commercial product) | Pigment composition of the invention |
|---|---|---|---|
| Amount of colorant added (based on the whole system) |  | 3 % | 1 % |
| Shade |  | Standard | Nearly standard |
| Tinting strength |  | Standard | 100 % |
| Heat resistance (Gray scale) | 230° × 3 hr. | 3 | 4 – 5 |
|  | 190 – 200° × 6 hr. | 3 | 4 – 5 |
| Weathering Resistance (Gray scale) | Out door exposure (3 months) | 3 | 4 |
|  | Sunshine weather-O-meter (600 hrs.) | 3 | 4 |
|  | Fade-O-meter (300 hrs.) | 6 – 7 | 7 – 8 |
| Dispersibility |  | Poor | Very good |
| Resistance to chemicals |  | Poor | Good |

As can be seen from the table, the pigment composition of the present invention has a quality superior to that of a 1 : 1 mixture of cadmopon yellow and chrome yellow which is now in a practical use, and has no danger of toxicity due to the heavy metals such as cadmium, chromium and lead. Moreover, since the pigment composition has a tinting strength of three times that of the mixture thereby it is very satisfactory in practical use as a thermoplastic type paint.

REFERENCE EXAMPLE

The heat-resistance tests were carried out at 200° C and 230° C on the following yellow organic pigments which are now being employed in practice. It was found from the test results that all the pigments were very unsuitable for a thermoplastic traffic paint, because they were all much inferior to the present pigment in the heat resistance, for example the resistance being below 3 under the same test condition as described in Comparative Example.

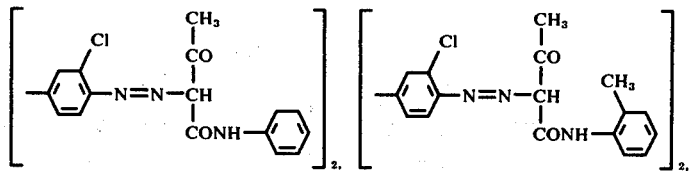

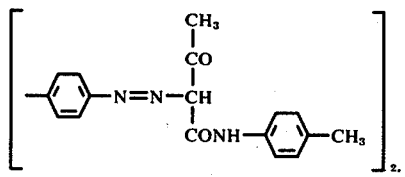

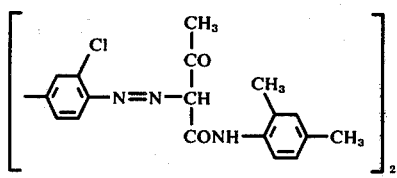

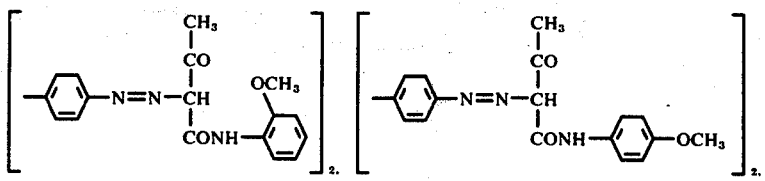

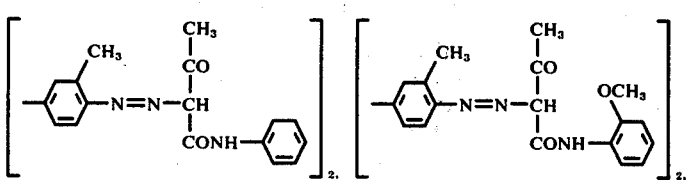

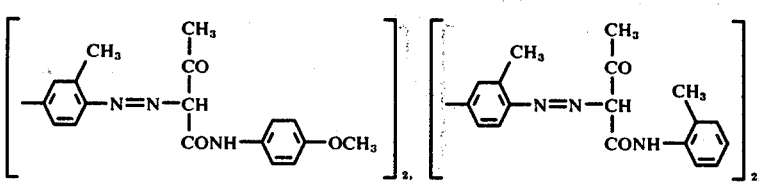

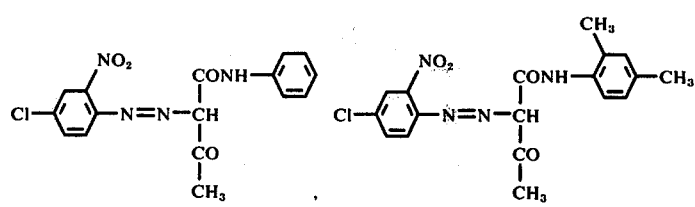

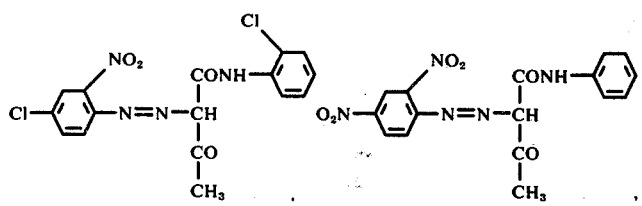

-continued
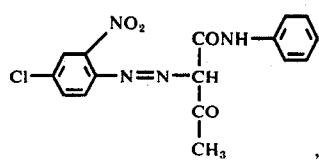
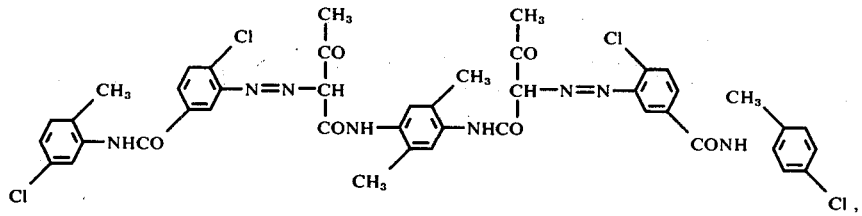
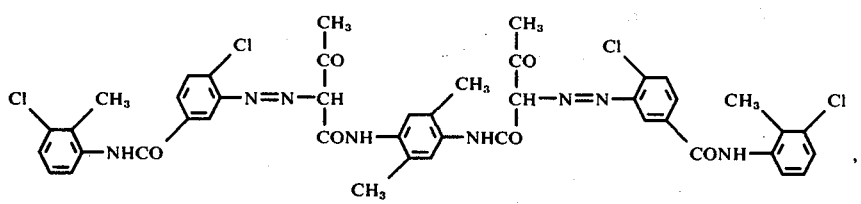
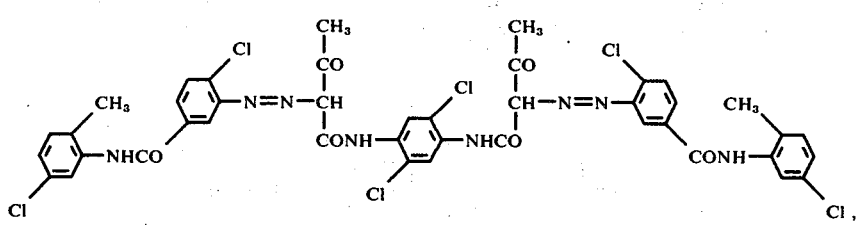
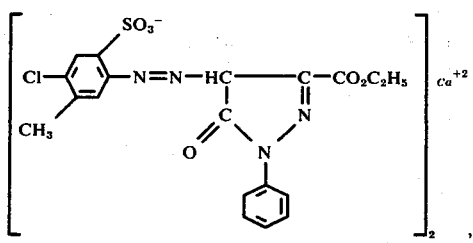
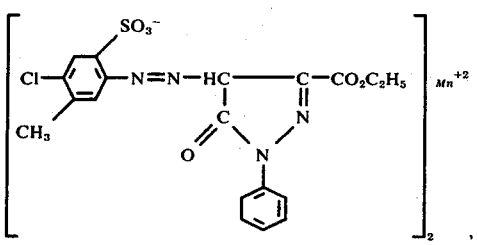
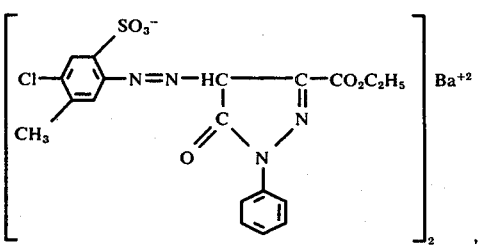

-continued
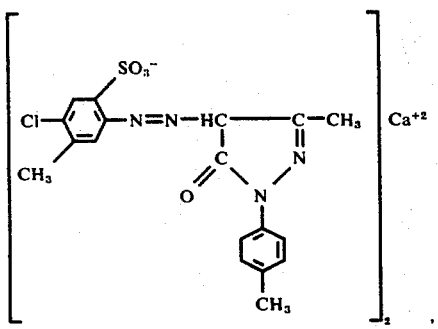
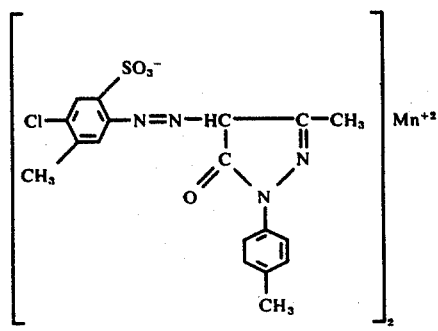
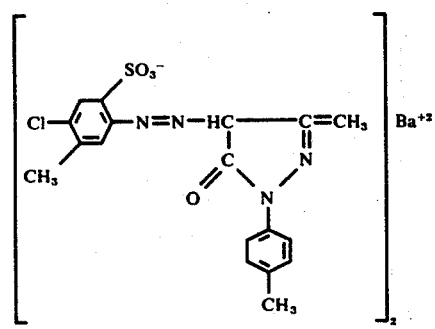
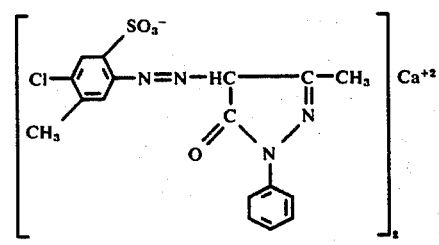
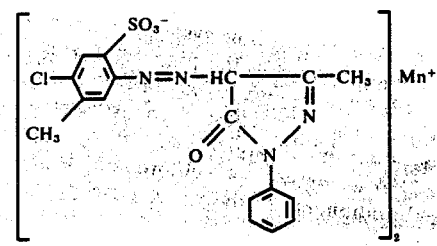

-continued

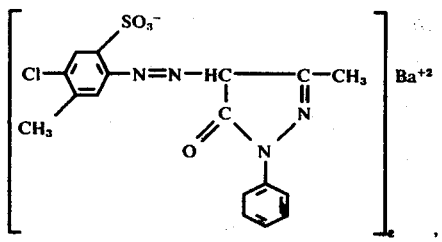

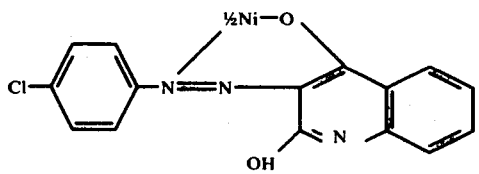

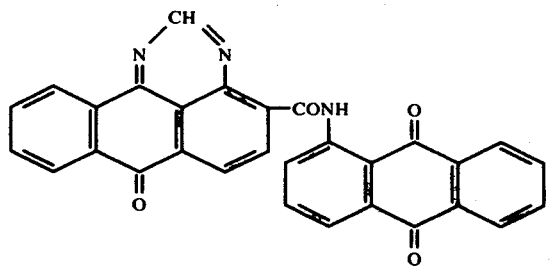

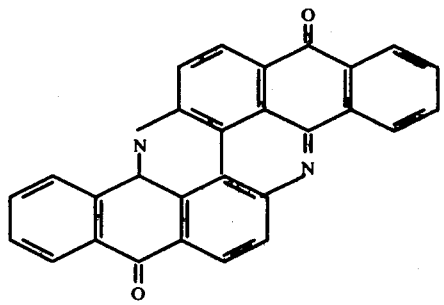

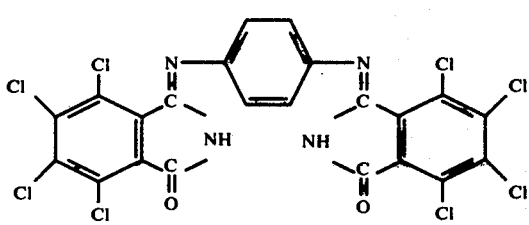

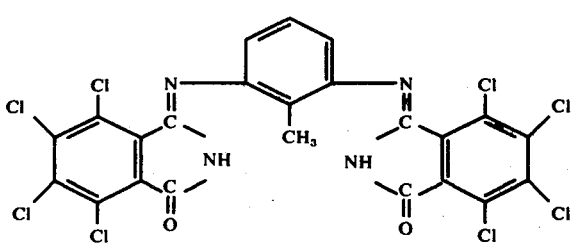

What is claimed is:

1. In a thermoplastic traffic paint containing at least one pigment, at least one filler and at least one natural and/or synthetic resin, the pigment being used in an amount of about 0.5 to 10% by weight based on the whole system, the filler being used in an amount of about 40 to 70% by weight based on the whole system, and the resin being used in an amount of about 20 to 30% by weight based on the whole system, an improvement which comprises using as the pigment a pigment containing 4,4-bis[acetoaceto-(2″,5″-dimethoxy-4″-chloro)-anilido-2-azo]-3,3′-dichlorodiphenyl and a white pigment, the mixing ratio by weight of 4,4-bis-[acetoaceto-(2″,5″-dimethoxy-4″-chloro)anilido-2-azo]-3,3′-dichlorodiphenyl to the white pigment being 5:95 to 95:5.

2. The paint according to claim 1, wherein the pigment is used in the form of pigment composition, dry color, color paste, color chip or color master batch.

3. The paint according to claim 1, wherein the pigment composition further contains another organic or inorganic pigment and an extender pigment.

4. A process for road-marking, which comprises using the thermoplastic traffic paint according to claim 1.

* * * * *